(12) United States Patent
Nishimura

(10) Patent No.: US 11,368,101 B2
(45) Date of Patent: Jun. 21, 2022

(54) POWER CONVERSION SYSTEM

(71) Applicant: TOSHIBA MITSUBISHI-ELECTRIC INDUSTRIAL SYSTEMS CORPORATION, Chuo-ku (JP)

(72) Inventor: Kazuki Nishimura, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/757,667

(22) PCT Filed: Dec. 21, 2017

(86) PCT No.: PCT/JP2017/045938
§ 371 (c)(1),
(2) Date: Apr. 20, 2020

(87) PCT Pub. No.: WO2019/123608
PCT Pub. Date: Jun. 27, 2019

(65) Prior Publication Data
US 2020/0336077 A1 Oct. 22, 2020

(51) Int. Cl.
*H02M 5/458* (2006.01)
*H02J 9/06* (2006.01)
(Continued)

(52) U.S. Cl.
CPC .......... *H02M 5/4585* (2013.01); *H02J 9/062* (2013.01); *H02M 3/33584* (2013.01); *H02M 7/53871* (2013.01)

(58) Field of Classification Search
CPC .......... H02M 5/4585; H02M 3/33584; H02M 7/53871; H02M 5/40; H02M 5/42;
(Continued)

(56) References Cited

U.S. PATENT DOCUMENTS 7,960,939 B2 * 6/2011 Steimer .................. B60L 50/13
318/803
8,188,694 B2 * 5/2012 Tallam ................ H02M 5/4585
318/400.3

(Continued)

FOREIGN PATENT DOCUMENTS

| JP | 2007-74823 A | 3/2007 |
| JP | 2017-022815 A | 1/2017 |
| WO | WO 2013/007268 A2 | 1/2013 |

OTHER PUBLICATIONS

International Search Report dated Feb. 6, 2018 in PCT/JP2018/045938 filed Dec. 21, 2017.

(Continued)

*Primary Examiner* — Gary L Laxton
(74) *Attorney, Agent, or Firm* — Oblon, McClelland, Maier & Neustadt, L.L.P.

(57) ABSTRACT

First to n-th (n is an integer of 2 or more) power conversion devices are connected in parallel to a load. First to n-th fuses are provided in first to n-th wirings, respectively. Each of the first to n-th power conversion devices includes a converter, an inverter, and a DC bus supplying a DC voltage from the converter to the inverter, and capacitors connected to the DC bus. An i-th ($1 \leq i \leq n-1$) wiring includes the DC bus of an i-th power conversion device and the DC bus of an (i+1)-th power conversion device. The n-th wiring is connected between the DC bus of the n-th power conversion device and the DC bus of the first power conversion device.

7 Claims, 5 Drawing Sheets

(51) Int. Cl.
*H02M 3/335* (2006.01)
*H02M 7/5387* (2007.01)

(58) Field of Classification Search
CPC ........ H02M 5/00; H02M 5/453; H02M 5/458; H02J 9/062
See application file for complete search history.

(56) References Cited

U.S. PATENT DOCUMENTS

| | | |
|---|---|---|
| 2012/0019070 A1 | 1/2012 | Matsuoka et al. |
| 2013/0279213 A1* | 10/2013 | Saeki .................. H02M 5/4585 363/37 |
| 2016/0056667 A1* | 2/2016 | Konishi .................. H02J 9/062 307/66 |
| 2016/0172992 A1* | 6/2016 | Tallam .................. H02M 7/062 363/37 |
| 2016/0241057 A1 | 8/2016 | Yang |
| 2017/0012549 A1 | 1/2017 | Abe et al. |

OTHER PUBLICATIONS

Office Action dated Jun. 28, 2021, in India Patent Application No. 202017018265.
Supplementary European Search Report dated Jul. 15, 2021, in Japanese Patent Application No. EP 17 93 5346.
Office Action dated Dec. 15, 2021, in Korean Patent Application No. 10-2020-7020626, w/English Machine Translation.
Office Action dated Feb. 21, 2022, in Korean Patent Application No. 10-2020-7020626 w/English Translation.

* cited by examiner

POWER CONVERSION SYSTEM

TECHNICAL FIELD

The present invention relates to a power conversion system, and more particularly to a power conversion system including a plurality of power conversion devices connected in parallel to a load.

BACKGROUND ART

Conventionally, there is known an uninterruptible power supply system including a plurality of uninterruptible power supply devices connected in parallel to a load. Each uninterruptible power supply device includes a forward conversion circuit (converter) that converts an AC voltage supplied from an AC power supply into a DC voltage, an inverse conversion circuit (inverter) that converts the DC voltage into the AC voltage to supply the AC voltage to the load, and a DC bus through which the DC voltage generated by the forward conversion circuit to the inverse conversion circuit.

Japanese Patent Laying-Open No. 2007-74823 (PTL 1) discloses a power conversion device including a DC positive bus, a DC negative bus, two fuses, and two unit inverters. Each unit inverter includes a capacitor and a semiconductor module that are connected in parallel to each other. A positive terminal of the semiconductor module is connected to the DC positive bus through the fuse, and the negative terminal of the semiconductor module is connected to the DC negative bus. When the semiconductor module of the unit inverter is broken down to become a short-circuit state, overcurrent flows to blow out the fuse (becomes a non-conduction state).

CITATION LIST

Patent Literature

PTL 1: Japanese Patent Laying-Open No. 2007-74823

SUMMARY OF INVENTION

Technical Problem

The conventional uninterruptible power supply system has a problem in that a cross current flows between output terminals of the plurality of inverters when output voltages at the plurality of inverters vary. A method in which the input voltages at the plurality of inverters are made uniform to prevent the variation in the output voltages of the plurality of inverters is considered as a countermeasure. In this method, for each uninterruptible power supply device, a voltage detector that detects the DC voltage is required for control of the DC voltage supplied from the converter to the inverter.

In the uninterruptible power supply system, it is necessary to charge the capacitor in preparation for starting in order to prevent an inrush current from flowing into the capacitor connected to the DC bus of each uninterruptible power supply device during the starting. For this reason, it is necessary to provide a pre-charging circuit that charges the capacitor for each uninterruptible power supply device.

When the voltage detector and the pre-charging circuit are provided for each uninterruptible power supply device as described above, the uninterruptible power supply device is enlarged, which results in a problem in that the uninterruptible power supply system is enlarged.

A main object of the present invention is to reduce downsizing of the power conversion system including the plurality of power conversion devices connected in parallel to the load.

Solution to Problem

According to one aspect of the present invention, a power conversion system includes: first to n-th (n is an integer of 2 or more) power conversion devices connected in parallel to a load; first to n-th wirings; and first to n-th fuses provided in the first to n-th wirings, respectively. Each of the first to n-th power conversion devices includes: a converter that converts an AC voltage into a DC voltage; an inverter that converts a DC voltage into an AC voltage to supply the AC voltage to the load; a DC bus through which the DC voltage is supplied from the converter to the inverter; and a capacitor that smooths the DC voltage, the capacitor being connected to the DC bus. An i-th ($1 \leq i \leq n-1$) wiring is connected between the DC bus of the i-th power conversion device and the DC bus of the (i+1)-th power conversion device. The n-th wiring is connected between the DC bus of the n-th power conversion device and the DC bus of the first power conversion device.

Advantageous Effects of Invention

The present invention can achieve the downsizing of the power conversion system including the plurality of power conversion devices connected in parallel to the load.

DESCRIPTION OF EMBODIMENT

Figure 1:
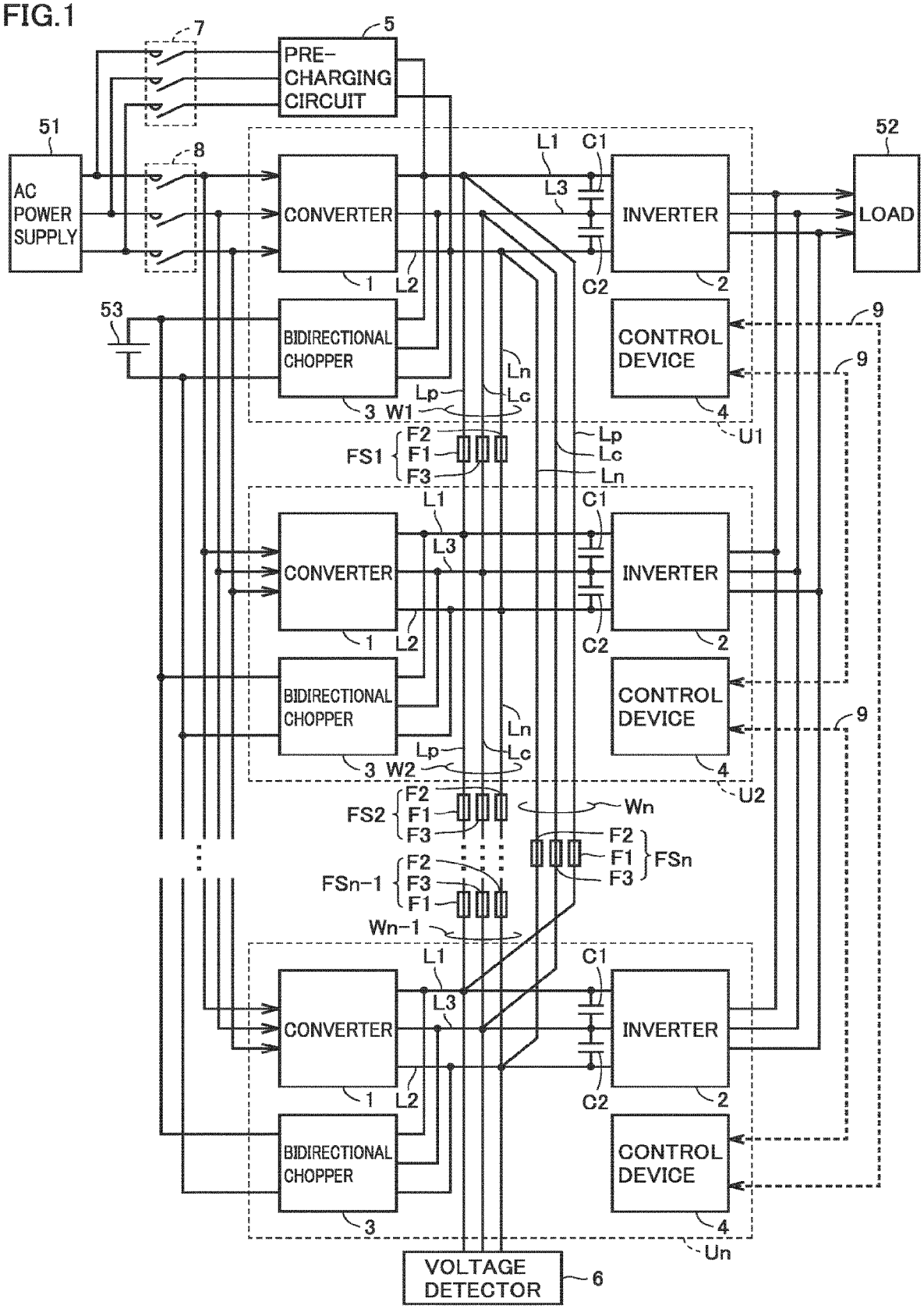
FIG. 1 is a circuit block diagram illustrating a configuration of a power conversion system according to an embodiment of the present invention.

Hereinafter, an embodiment of the present invention will be described in detail with reference to the drawings. In the drawings, the same or corresponding portions are denoted by the same reference numeral, and the description will not be repeated in principle.

(Configuration of Power Conversion System)

FIG. 1 is a circuit block diagram illustrating a configuration of a power conversion system according to an embodiment of the present invention. For example, the power conversion system of the embodiment of the present invention can be applied to an uninterruptible power supply system that connects a plurality of uninterruptible power supply devices in parallel to supply power to a load.

With reference to FIG. 1, the uninterruptible power supply system includes n (n is an integer of 2 or more) uninterruptible power supply devices U1 to Un connected in parallel between an AC power supply 51 and a load 52. Each uninterruptible power supply device corresponds to an example of the "power conversion device". One battery 53 is provided commonly to n uninterruptible power supply devices U1 to Un. Battery 53 corresponds to an example of the "power storage device". A capacitor may be provided instead of battery 53. An uninterruptible power supply device Uk (1≤k≤n) corresponds to the "k-th uninterruptible power supply device (k-th power conversion device)".

AC power supply 51 supplies three-phase AC power of a commercial frequency to uninterruptible power supply devices U1 to Un. A switch 8 is provided on a connection line connecting AC power supply 51 and uninterruptible power supply devices U1 to Un. Switch 8 is turned on and off (on and off) in response to a control signal from a control device (not illustrated) that controls the entire uninterruptible power supply system, thereby conducting and cutting off a power supply path between AC power supply 51 and uninterruptible power supply devices U1 to Un. Load 52 is driven by the three-phase AC power of the commercial frequency supplied from uninterruptible power supply devices U1 to Un. Battery 53 stores DC power.

Each of uninterruptible power supply devices U1 to Un includes a converter 1, an inverter 2, a bidirectional chopper 3, a control circuit 4, a DC positive bus L1, a DC negative bus L2, a DC neutral point bus L3, and capacitors C1, C2.

Converter 1 generates a positive voltage, a negative voltage, and a neutral point voltage, based on the three-phase AC voltage supplied from AC power supply 51. The positive voltage, the negative voltage, and the neutral point voltage that are generated by converter 1 are applied to inverter 2 through DC positive bus L1, DC negative bus L2, and DC neutral point bus L3, respectively.

Capacitor C1 is connected between DC positive bus L1 and DC neutral point bus L3. Capacitor C1 smoothes and stabilizes the DC voltage between DC buses L1, L3. Capacitor C2 is connected between DC neutral point bus L3 and DC negative bus L2. Capacitor C2 smoothes and stabilizes the DC voltage between DC buses L3, L2.

Inverter 2 generates the three-phase AC voltage based on the positive voltage, the negative voltage, and the neutral point voltage that are supplied from converter 1 through DC buses L1 to L3, and supplies the three-phase AC voltage to load 52.

In a normal time when the three-phase AC voltage is supplied from AC power supply 51, bidirectional chopper 3 steps down each of the DC voltage between DC buses L1, L3 and the DC voltage between the DC buses L3, L2, and supplies each stepped-down DC voltage to battery 53, thereby charging battery 53. In a power outage time when the supply of the three-phase AC voltage from AC power supply 51 is stopped, bidirectional chopper 3 boosts the voltage between terminals of battery 53, and supplies the boosted voltage to between DC buses L1, L2, thereby discharging battery 53.

Control circuit 4 controls converter 1, inverter 2, and bidirectional chopper 3 based on a three-phase AC voltage supplied from AC power supply 51, a DC voltage at each of DC buses L1, L2, L3, voltage between terminals of battery 53, a three-phase AC voltage output from inverter 2, and a three-phase AC current (load current) flowing from inverter 2 to load 52.

Control circuits 4 of uninterruptible power supply devices U1 to Un are connected to one another by a communication line 9, and exchange various pieces of information including a load current. Control circuit 4 divides a sum of the load currents of uninterruptible power supply devices U1 to Un by the number of running uninterruptible power supply devices U to obtain a sharing current of an own device. Control circuit 4 controls the own device so as to output the sharing current.

(Configuration of Power Conversion Circuit)

Figure 2:
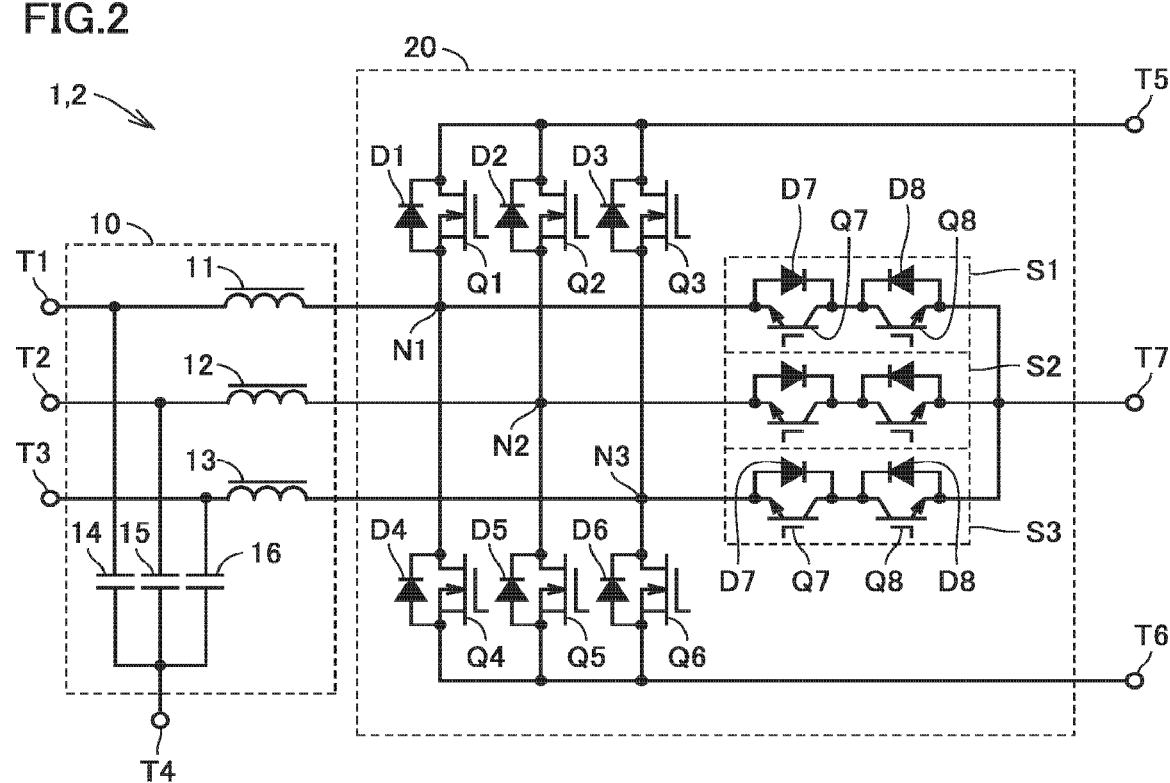
FIG. 2 is a circuit diagram illustrating a configuration of a power conversion circuit included in each of a converter and an inverter.

FIG. 2 is a circuit diagram illustrating a configuration of a power conversion circuit included in each of converter 1 and inverter 2 in FIG. 1.

With reference to FIG. 2, the power conversion circuit includes AC terminals T1 to T3, a neutral point terminal T4, DC terminals T5 to T7, an AC filter 10, and a semiconductor module 20.

AC terminals T1 to T3 are used to transmit and receive the three-phase AC voltage. Neutral point terminal T4 of converter 1 and neutral point terminal T4 of inverter 2 are connected to each other. DC terminals T5 to T7 are used to transmit and receive the positive voltage, the negative voltage, and the neutral point voltage, respectively. The neutral point voltage is an intermediate voltage between the positive voltage and the negative voltage.

AC filter 10 includes reactors 11 to 13 and capacitors 14 to 16. One terminals of reactors 11 to 13 are respectively connected to AC terminals T1 to T3, and the other terminals of reactors 11 to 13 are respectively connected to nodes N1 to N3 of semiconductor module 20. One electrodes of capacitors 14 to 16 are respectively connected to AC terminals T1 to T3, and the other electrodes of capacitors 14 to 16 are connected to neutral point terminal T4. AC filter 10 is a low-pass filter that passes the three-phase AC power of the commercial frequency and cuts off a signal having a switching frequency generated in semiconductor module 20.

Semiconductor module 20 includes transistors Q1 to Q6, diodes D1 to D6, and AC switches S1 to S3. For example, each of transistors Q1 to Q6 is an N-channel MOS (Metal Oxide Semiconductor) transistor. Drains of transistors Q1 to Q3 are connected to DC terminal T5, and sources of transistors Q1 to Q3 are connected to nodes N1 to N3, respectively. Drains of transistors Q4 to Q6 are connected to nodes N1 to N3, respectively, and sources of transistors Q4 to Q6 are connected to DC terminal T6.

Diodes D1 to D6 are connected in reverse-parallel to transistors Q1 to Q6, respectively.

Each of AC switches S1 to S3 includes transistors Q7, Q8 and diodes D7, D8. For example, each of transistors Q7, Q8 is an IGBT (Insulated Gate Bipolar Transistor). Emitters of transistors Q7 of AC switches S1 to S3 are connected to nodes N1 to N3, respectively, and emitters of transistors Q8 of AC switches S1 to S3 are connected to DC terminal T7. In each of AC switches S1 to S3, collectors of transistors Q7, Q8 are connected to each other. Diodes D7, D8 are connected in reverse-parallel to transistors Q7, Q8, respectively.

Control circuit 4 performs PWM (Pulse Width Modulation) control on transistors Q1 to Q8, and turns on and off transistors Q1 to Q8 in predetermined timing in synchronization with the three-phase AC voltage from AC power supply 51. For example, transistors Q1 to Q3 are sequentially turned on and off in synchronization with the three-phase AC voltage. Transistors Q4 to Q6 are turned off while transistors Q1 to Q3 are turned on, respectively. Transistors Q4 to Q6 are turned on while transistors Q1 to Q3 are turned off, respectively.

In converter 1, AC terminals T1 to T3 receive the three-phase AC voltage from AC power supply 51, DC terminal T5 is connected to one end of DC positive bus L1, DC terminal T6 is connected to one end of DC negative bus L2, and DC terminal T7 is connected to one end of the DC neutral point bus L3. AC filter 10 causes the three-phase AC power of the commercial frequency supplied from AC power supply 51 to pass through semiconductor module 20, and prevents the signal of the switching frequency generated in semiconductor module 20 from passing through AC power supply 51.

In converter 1, semiconductor module 20 constitutes a three-level converter, which generates the positive voltage, the negative voltage, and the neutral point voltage based on the three-phase AC voltage supplied from AC power supply 51 through AC filter 10 and provides the generated positive voltage, negative voltage, and neutral point voltage to DC terminals T5 to T7.

For example, when the voltage at AC terminal T1 is higher than the voltage at AC terminal T2, transistor Q1 and transistors Q7, Q8 of AC switch S2 are turned on, and the current passes through the path of AC terminal T1, AC filter 10 (reactor 11), transistor Q1, DC terminal T5, capacitor C1, DC terminal T7, AC switch S2 (transistors Q8, Q7), AC filter 10 (reactor 12), and AC terminal T2 to charge capacitor C1.

When the voltage at AC terminal T1 is higher than the voltage at AC terminal T3, transistors Q7, Q8 and transistor Q6 of AC switch S1 are turned on, and the current passes through the path of AC terminal T1, AC filter 10 (reactor 11), AC switch S1 (transistors Q7, Q8), DC terminal T7, capacitor C12, DC terminal T6, transistor Q6, AC filter 10 (reactor 13), and AC terminal T3 to charge capacitor C2.

In inverter 2, AC terminals T1 to T3 are connected to load 52, DC terminal T5 is connected to the other end of DC positive bus L1, DC terminal T6 is connected to the other end of DC negative bus L2, and DC terminal T7 is connected to the other end of DC neutral point bus L3. Semiconductor module 20 constitutes a three-level inverter, which generates the three-phase AC voltage based on the positive voltage, the negative voltage, and the neutral point voltage supplied from converter 1 or bidirectional chopper 3 through DC buses L1 to L3 and outputs the generated three-phase AC voltage to nodes N1 to N3. For example, each of the three-phase AC voltages generated by the semiconductor module 20 is a three-level AC voltage that changes in the order of the positive voltage, the neutral point voltage, the negative voltage, the neutral point voltage, the positive voltage, . . . .

For example, when transistor Q1 and transistors Q7, Q8 of AC switch S2 are turned on, the current flows through the path of DC terminal T5, transistor Q1, AC filter 10 (reactor 11), AC terminal T1, load 52, AC terminal T2, AC filter 10 (reactor 12), AC switch S2 (transistors Q7, Q8), and DC terminal T7 to discharge capacitor C1.

When transistors Q7, Q8 of AC switch S1 and transistor Q6 are turned on, the current flows through the path of DC terminal T7, AC switch S1 (transistors Q8, Q7), AC filter 10 (reactor 11), AC terminal T1, load 52, AC terminal T3, AC filter 10 (reactor 11), transistor Q6, and DC terminal T6 to discharge capacitor C2.

In inverter 2, AC filter 10 causes the three-phase AC voltage of the commercial frequency generated by semiconductor module 20 to pass through load 52, and prevents the signal of the switching frequency generated in semiconductor module 20 from passing through load 52. In other words, AC filter 10 of inverter 2 converts the three-phase three-level AC voltage generated by semiconductor module 20 into a three-phase sine-wave AC voltage, and provides the three-phase sine-wave AC voltage to load 52.

(Configuration of Bidirectional Chopper)

Figure 3:
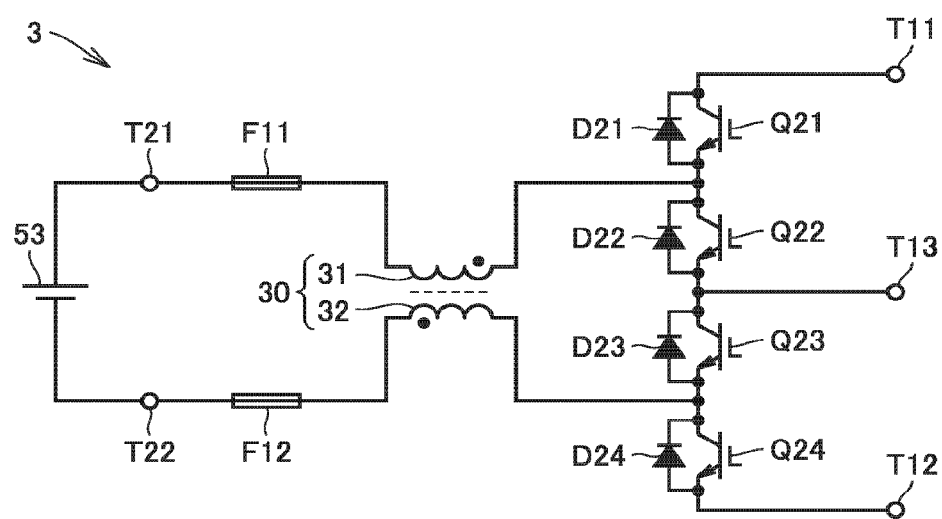
FIG. 3 is a circuit diagram illustrating a configuration of a bidirectional chopper.

FIG. 3 is a circuit diagram illustrating a configuration of bidirectional chopper 3 in FIG. 1.

With reference to FIG. 3, bidirectional chopper 3 includes DC terminals T11 to T13, battery terminals T21, T22, transistors Q21 to Q24, diodes D21 to D24, a normal mode reactor 30, and fuses F11, F12. Normal mode reactor 30 includes two coils 31, 32. DC terminals T11, T12, T13 are connected to DC positive bus L1, DC negative bus L2, and DC neutral point bus L3, respectively. Battery terminals T21, T22 are connected to positive and negative electrodes of battery 53.

For example, each of transistors Q21 to Q24 is an IGBT. Transistors Q21, Q22 are connected in series between DC terminals T11, T13, and transistors Q23, Q24 are connected in series between DC terminals T13, T12. Diodes D21 to D24 are connected in reverse-parallel to transistors Q21 to Q24, respectively.

One terminal of coil 31 is connected to the emitter of transistor Q21, and the other terminal is connected to battery terminal T21 through fuse F11. One terminal of coil 32 is connected to battery terminal T22 through fuse F12, and the other terminal is connected to the emitter of transistor Q23. When an overcurrent flows, fuses F11, F12 are blown out to protect battery 53 and bidirectional chopper 3.

Bidirectional chopper 3 can perform three battery charging modes by controlling turn-on and turn-off of transistors Q21 to Q24. In the first battery charging mode, transistor Q21 is turned on and transistors Q22 to Q24 are turned off. When the current flows from DC terminal T11 to DC terminal T13 through transistor Q21, coil 31, battery 53, fuse F12, coil 32, and diode D23, capacitor C1 is discharged and battery 53 is charged.

In the second battery charging mode, transistors Q21, Q24 are turned on and transistors Q22, Q23 are turned off. When the current flows from DC terminal T11 to DC terminal T12 through transistor Q21, coil 31, fuse F1, battery 53, fuse F12, coil 32, and transistor Q23, capacitors C1, C2 are discharged and battery 53 is charged.

In the third battery charging mode, transistor Q24 is turned on and transistors Q21 to Q23 are turned off. When the current flows from DC terminal T13 to DC terminal T12 through diode D22, coil 31, fuse F11, battery 53, fuse F12, coil 32, and transistor Q24, capacitor C2 is discharged and battery 53 is charged.

The first battery charging mode and the second battery charging mode are alternately performed. Transistors Q21 to Q24 are turned off during a period between the first battery charging mode and the second battery charging mode. Electromagnetic energy stored in coils 31, 32 is released, and the current flows through a path of diode D22, coil 31, fuse F11, battery 53, fuse F12, coil 32, and diode D23, and battery 53 is charged. The second battery charging mode is a mode in which the first battery charging mode and the third battery charging mode overlap each other.

Bidirectional chopper 3 can further perform three discharge modes by controlling the turn-on and the turn-off of transistors Q21 to Q24. In the first discharge mode, transistor Q22 is turned on and transistors Q21, Q23, Q24 are turned off. When the current flows from the positive electrode of battery 53 to the negative electrode of battery 53 through fuse F11, coil 31, transistor Q22, capacitor C2, diode D24, coil 32, and fuse F12, battery 53 is discharged and capacitor C2 is charged.

In the second discharge mode, transistors Q21 to Q24 are turned off. When the current flows from the positive electrode of battery 53 to the negative electrode of battery 53 through fuse F11, coil 31, diode D21, capacitors C1, C2, diode D24, coil 32, and fuse F12, battery 53 is discharged and capacitors C1, C2 are charged.

In the third discharge mode, transistor Q23 is turned on and transistors Q21, Q22, Q24 are turned off. When the current flows from the positive electrode of battery 53 to the negative electrode of battery 53 through fuse F11, coil 31, diode D21, capacitor C1, transistor Q23, coil 32, and fuse F12, battery 53 is discharged and capacitor C1 is charged.

The first battery discharge mode and the third battery discharge mode are alternately performed. The second battery discharge mode is performed when the voltage between DC terminals T11, T12 is lower than the voltage between the terminals of battery 53 in the period between the first battery discharge mode and the third battery discharge mode.

(Structure of Wiring and Fuse Unit)

With reference to FIG. 1 again, the uninterruptible power supply system further includes a plurality (n in FIG. 1) of wirings W1 to Wn and a plurality (n in FIG. 1) of fuse units FS1 to FSn. The wiring Wk (1≤k≤n) corresponds to the "k-th wiring", and the fuse unit FSk corresponds to the "k-th fuse unit".

Each of wirings W1 to Wn includes wiring lines Lp, Ln, Lc. In wiring W1, one terminals of wiring lines Lp, Ln, Lc are respectively connected to DC positive bus L1, DC negative bus L2, and DC neutral point bus L3 of uninterruptible power supply device U1, and the other terminals of wiring lines Lp, Ln, Lc are respectively connected to DC positive bus L1, DC negative bus L2 and DC neutral point bus L3 of uninterruptible power supply device U2. In wiring W2, one terminals of wiring lines Lp, Ln, Lc are respectively connected to DC positive bus L1, DC negative bus L2, and DC neutral point bus L3 of uninterruptible power supply device U2, and the other terminals of wiring lines Lp, Ln, Lc are respectively connected to DC positive bus L1, DC negative bus L2 and DC neutral point bus L3 (not illustrated) of uninterruptible power supply device U3. In wiring Wn−1, one terminals of wiring lines Lp, Ln, Lc are respectively connected to DC positive bus L1, DC negative bus L2, and DC neutral point bus L3 of uninterruptible power supply device Un−1, and the other terminals of wiring lines Lp, Ln, Lc are respectively connected to DC positive bus L1, DC negative bus L2 and DC neutral point bus L3 (not illustrated) of uninterruptible power supply device Un.

That is, in i-th wiring Wi (1≤i≤n−1), one terminals of wiring lines Lp, Ln, Lc are respectively connected to DC positive bus L1, DC negative bus L2, and DC neutral point bus L3 of i-th uninterruptible power supply device Ui, and the other terminals of wiring lines Lp, Ln, Lc are respectively connected to DC positive bus L1, DC negative bus L2 and DC neutral point bus L3 of (i+1)-th uninterruptible power supply device Ui+1.

On the other hand, in n-th wiring Wn, one terminals of wiring lines Lp, Ln, Lc are respectively connected to DC positive bus L1, DC negative bus L2, and DC neutral point bus L3 of n-th uninterruptible power supply device Un, and the other terminals of wiring lines Lp, Ln, Lc are respectively connected to DC positive bus L1, DC negative bus L2 and DC neutral point bus L3 of first uninterruptible power supply device U1.

Thus, in the whole of wirings W1 to Wn, wiring line Lp is connected annularly between DC positive buses L1 of uninterruptible power supply devices U1 to Un, and the voltages at DC positive buses L1 of uninterruptible power supply devices U1 to Un can be matched with each other. Wiring line Ln is connected annularly between DC negative buses L2 of uninterruptible power supply devices U1 to Un, and the voltages at DC negative buses L2 of uninterruptible power supply devices U1 to Un can be matched with each other. Wiring line Lc is connected annularly between DC neutral point buses L3 of uninterruptible power supply devices U1 to Un, and the voltages at DC negative buses L2 of uninterruptible power supply devices U1 to Un can be matched with each other.

Consequently, the input voltages at inverters 2 of uninterruptible power supply devices U1 to Un can be matched with each other. Thus, a variation in the output voltages at inverters 2 of uninterruptible power supply devices U1 to Un can be reduced, so that a cross current flowing between the output terminals of inverters 2 of uninterruptible power supply devices U1 to Un can be reduced.

Fuse units FS1 to FSn are provided in wirings W1 to Wn, respectively. Each of fuse units FS1 to FSn includes fuses F1 to F3. Fuse F1 is provided on wiring line Lp, and is blown out when the overcurrent flows through wiring line Lp. Fuse F2 is provided on wiring line Ln, and is blown out when the overcurrent flows through wiring line Ln. Fuse F3 is provided on wiring line Lc, and is blown out when the overcurrent flows through wiring line Lc.

That is, k-th fuse unit FSk is provided in k-th wiring Wk. In k-th fuse unit FSk, each of fuses F1 to F3 is blown out when the overcurrent flows through wiring lines Lp, Ln, Lc of k-th wiring Wk, thereby protecting the uninterruptible power supply system. As a result, a breakdown range can be narrowed.

Specifically, when converter 1, inverter 2, bidirectional chopper 3, and the like of uninterruptible power supply device Uk or Uk+1 are broken down to short-circuit DC buses L1, L3, the overcurrent flows between DC buses L1, L3 of uninterruptible power supply device Uk and DC buses L1, L3 of uninterruptible power supply device Uk+1 through wiring lines Lp, Lc of wiring Wk. In this case, when at least one of fuses F1, F3 of fuse unit FSk is blown out, buses L1, L3 of uninterruptible power supply device Uk and buses L1, L3 of uninterruptible power supply device Uk+1 are electrically disconnected. Thus, the breakdown of the sound uninterruptible power supply device can be prevented.

For example, when transistor Q11 included in semiconductor module 20 of converter 1 of uninterruptible power supply device Uk is broken down and fixed in a conductive state, AC switch S1 (transistors Q17, Q18) is turned on to short-circuit DC bus L1, L3. When DC buses L1, L3 of uninterruptible power supply device Uk are short-circuited, for example, the overcurrent flows from the positive electrode of capacitor C1 of uninterruptible power supply device Uk+1 to the negative electrode of capacitor C1 of uninterruptible power supply device Uk+1 through fuse F1, the short-circuit portion of uninterruptible power supply device Uk, and fuse F3. At least one of fuses F1, F3 is blown out by the overcurrent, thereby cutting off the overcurrent.

Alternatively, when uninterruptible power supply device Uk or Uk+1 is broken down to short-circuit buses L2, L3, the overcurrent flows between buses L2, L3 of uninterruptible power supply device Uk and buses L2, L3 of uninterruptible power supply device Uk+1 through wiring lines Lc, Ln of wiring Wk. In this case, at least one of fuses F2, F3 of fuse unit FSk is blown out, thereby cutting off the overcurrent.

Alternatively, when uninterruptible power supply device Uk or Uk+1 is broken down to short-circuit buses L1, L2, the overcurrent flows between buses L1, L2 of uninterruptible power supply device Uk and buses L1, L2 of uninterruptible power supply device Uk+1 through wiring lines Lp, Ln of wiring Wk. In this case, at least one of fuses F1, F2 of fuse unit FSk is blown out, thereby cutting off the overcurrent.

When the uninterruptible power supply system is normal, the current flowing through fuses F1 to F3 of each fuse unit is sufficiently smaller than a rated current value of each of uninterruptible power supply devices U1 to Un. For this reason, a rated breaking current value of each of fuses F1 to F3 is selected to be smaller than the rated current value of each of uninterruptible power supply devices U1 to Un. When the current flowing through the fuse exceeds the rated breaking current value, the fuse is blown out and the current flowing through the fuse is cut off.

An allowable current values of wiring lines Lp, Ln, Lc of each wiring are selected to be smaller than an allowable current values of buses L1, L2, L3. The wiring line generates heat when the current flowing through the wiring line exceeds the allowable current value.

(Configuration of Pre-Charging Circuit)

As illustrated in FIG. 1, the uninterruptible power supply system further includes a pre-charging circuit 5. In the example of FIG. 1, pre-charging circuit 5 is connected between AC power supply 51 and DC buses L1, L2 of first uninterruptible power supply device U1. A switch 7 is provided on a connection line connecting AC power supply 51 and pre-charging circuit 5. Switch 7 is turned on and off in response to a control signal from a control device (not illustrated), thereby turning on and off a power supply path between AC power supply 51 and pre-charging circuit 5.

When the uninterruptible power supply system is started, sometimes capacitors C1, C2 of each uninterruptible power supply device is in a non-charged state. In this case, when switch 8 is turned on to connect AC power supply 51 and each uninterruptible power supply device, there is a possibility that an excessive inrush current flows into capacitors C1, C2. In order to prevent the inrush current at the time of starting, capacitors C1, C2 of each uninterruptible power supply device are previously charged using pre-charging circuit 5 in preparation for starting the uninterruptible power supply system.

Specifically, when the uninterruptible power supply system is started, switch 8 is turned off, and switch 7 is turned on to connect pre-charging circuit 5 to AC power supply 51. Pre-charging circuit 5 generates the positive voltage and the negative voltage based on the three-phase AC voltage supplied from AC power supply 51. In uninterruptible power supply device U1, capacitors C1, C2 are charged by supplying the positive voltage and the negative voltage generated by pre-charging circuit 5 to DC positive bus L1 and DC negative bus L2, respectively.

Figure 4:
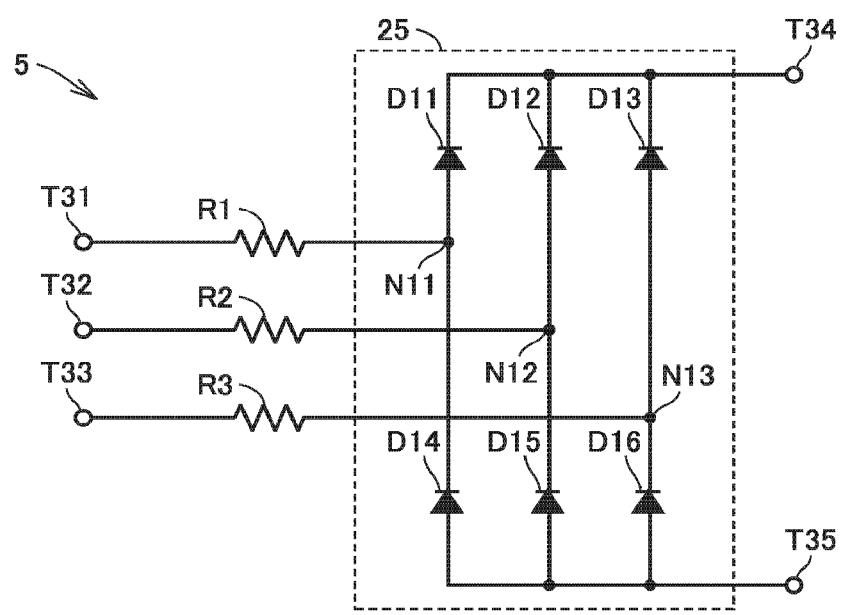
FIG. 4 is a circuit diagram illustrating a configuration of a pre-charging circuit.

FIG. 4 is a circuit diagram illustrating a configuration of pre-charging circuit 5 in FIG. 1.

With reference to FIG. 4, pre-charging circuit 5 includes AC terminals T31 to T33, DC terminals T34 and T35, resistance elements R1 to R3, and a semiconductor module 25.

AC terminals T31 to T33 receive the three-phase AC voltage from AC power supply 51 through switch 8 (FIG. 1). DC terminal T34 is connected to DC positive bus L1 of uninterruptible power supply device U1, and DC terminal T35 is connected to DC negative bus L2 of uninterruptible power supply device U1.

Resistance element R1 is connected between AC terminal T31 and node N11. Resistance element R2 is connected between AC terminal T32 and node N12. Resistance element R3 is connected between AC terminal T33 and node N13.

Semiconductor module 25 includes diodes D11 to D16. The cathodes of diodes D11 to D13 are connected to DC terminal T34, and the anodes of diodes D11 to D13 are connected to nodes N11 to N13, respectively. The cathodes of diodes D14 to D16 are connected to nodes N11 to N13, respectively, and the anodes of diodes D14 to D16 are connected to DC terminal T35.

Semiconductor module 25 constitutes a three-phase full-wave rectifier circuit including a diode bridge. Semiconductor module 25 generates the positive voltage and the negative voltage based on the three-phase AC voltage supplied from AC power supply 51 through resistance elements R1 to R3, and supplies the generated positive voltage and negative voltage to DC positive bus L1 and DC negative bus L2 of uninterruptible power supply device U1.

As described above, DC positive buses L1 of uninterruptible power supply devices U1 to Un are connected to each other by wiring lines Lp of wirings W1 to Wn. Thus, the positive voltage supplied from pre-charging circuit 5 to DC positive bus L1 of uninterruptible power supply device U1 is supplied to DC positive bus L1 of each of uninterruptible power supply devices U2 to Un through wiring lines Lp.

Similarly, DC negative buses L2 of uninterruptible power supply devices U1 to Un are connected to each other by wiring lines Ln of wirings W1 to Wn. Thus, the negative voltage supplied from pre-charging circuit 5 to DC negative bus L2 of uninterruptible power supply device U1 is supplied to DC negative bus L2 of each of uninterruptible power supply devices U2 to Un through wiring lines Ln.

In this way, the positive voltage and the negative voltage generated by pre-charging circuit 5 are supplied to DC positive bus L1 and DC negative bus L2 of each of uninterruptible power supply devices U1 to Un through each of wirings W1 to Wn, thereby charging capacitors C1, C2 of each uninterruptible power supply device. After capacitors C1, C2 of each uninterruptible power supply device are charged, switch 7 is turned off and switch 8 is turned on, thereby connecting AC power supply 51 to each uninterruptible power supply device.

The current flowing through wiring lines Lp, Ln, Lc of wirings W1 to Wn and fuses F1 to F3 of fuse units FS1 to FSn−1 during reserve charging is selected to be smaller than allowable current values of the wiring line and the fuse.

In the embodiment, DC positive buses L1 of uninterruptible power supply devices U1 to Un are connected to each other, and the DC negative buses L2 of uninterruptible power supply devices U1 to Un are connected to each other, so that all capacitors C1, C2 of uninterruptible power supply devices U1 to Un can collectively be charged by pre-charging circuit 5. Consequently, downsizing and cost reduction of the uninterruptible power supply system can be achieved.

(Configuration of Voltage Detector)

As illustrated in FIG. 1, the uninterruptible power supply system further includes a voltage detector 6. In the example of FIG. 1, voltage detector 6 is connected to DC buses L1 to L3 of n-th uninterruptible power supply device Un. When detecting the voltages at DC buses L1 to L3 of uninterruptible power supply device Un, voltage detector 6 outputs a signal indicating a detection value to control circuit 4 of uninterruptible power supply device Un.

As described above, in the embodiment, DC positive buses L1 of uninterruptible power supply devices U1 to Un are connected to each other, and the voltages at the DC positive buses L1 of uninterruptible power supply devices U1 to Un are matched with each other. DC negative buses L2 of uninterruptible power supply devices U1 to Un are connected to each other, and the voltages at DC negative buses L2 of uninterruptible power supply devices U1 to Un are matched with each other. DC neutral point buses L3 of uninterruptible power supply devices U1 to Un are connected to each other, and the voltages at DC neutral point buses L3 of uninterruptible power supply devices U1 to Un are matched with each other. Thus, the voltages at DC buses L1 to L3 of uninterruptible power supply devices U1 to Un can collectively be detected by one voltage detector 6 connected to DC buses L1, L2 of uninterruptible power supply device Un. Consequently, the downsizing and the cost reduction of the uninterruptible power supply system can be achieved.

(Operation of Uninterruptible Power Supply System)

An operation of the uninterruptible power supply system according to the embodiment will be described below.

Control circuits 4 of uninterruptible power supply devices U1 to Un are connected to each other by communication line 9 to constitute one integrated control circuit. The integrated control circuit monitors the detection value of voltage detector 6. In the reserve charging of capacitors C1, C2 described above, when the detection value of voltage detector 6 exceeds a predetermined reference value, the integrated control circuit determines that the charging of capacitors C1, C2 is completed, and stops the operation of pre-charging circuit 5.

During a normal time the three-phase AC power is normally supplied from AC power supply 51, converter 1 converts the three-phase AC power from AC power supply 51 into DC power in each of uninterruptible power supply devices U1 to Un. Control circuit 4 controls converter 1 such that the detection value of voltage detector 6 is matched with a predetermined command value. The DC power generated by converter 1 is stored in battery 53 by bidirectional chopper 3, and converted into the three-phase AC power by inverter 2 and supplied to load 52. Control circuit 4 controls inverter 2 so as to output the sharing current of the own device determined by dividing the sum of the load currents of uninterruptible power supply devices U1 to Un by the number of running uninterruptible power supply devices U.

During the power outage time when the supply of the three-phase AC power from AC power supply 51 is stopped, the operation of converter 1 in each of uninterruptible power supply devices U1 to Un is stopped. The DC power of battery 53 is supplied to inverter 2 through bidirectional chopper 3, converted into the three-phase AC power, and supplied to load 52. Control circuit 4 controls bidirectional chopper 3 such that the detection value of voltage detector 6 is matched with the command value, and controls inverter 2 such that inverter 2 outputs the sharing current of the own device. Thus, the operation of load 52 can be continued while the DC power is stored in battery 53.

Figure 5:
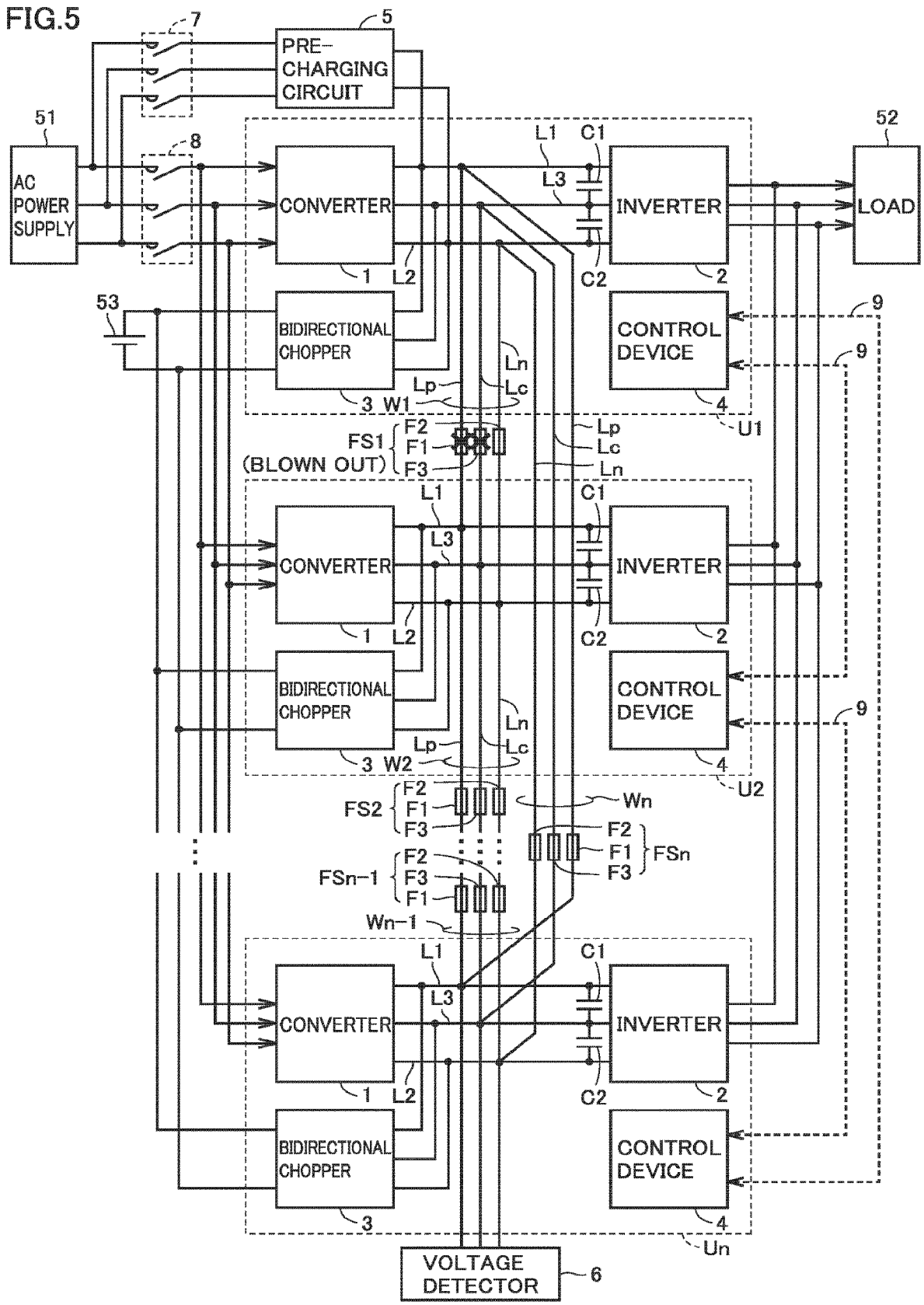
FIG. 5 is a view illustrating an operation of the power conversion system according to the embodiment of the present invention.

At this point, it is considered that at least one of fuses F1 to F3 is blown out in any one of fuse units FS1 to FSn. FIG. 5 illustrates the case where fuses F1 and F3 of fuse unit FS1 are blown out. For example, when transistor Q1 included in semiconductor module 20 of converter 1 of uninterruptible power supply device U1 is broken down and fixed in the conductive state, transistors Q7, Q8 of switch S1 are turned on to short-circuit DC bus L1, L3. When DC buses L1, L3 of uninterruptible power supply device U1 are short-circuited, for example, the overcurrent flows from the positive electrode of capacitor C1 of uninterruptible power supply device U2 to the negative electrode of capacitor C1 of uninterruptible power supply device U2 through fuse F1 of fuse unit FS2, the short-circuit portion (transistors Q1, Q7, Q8) of uninterruptible power supply device U1, and fuse F3 of fuse unit FS2. At least one of fuses F1, F3 of fuse unit FS2 is blown out by the overcurrent.

In this case, DC buses L1, L3 of uninterruptible power supply device U1 are physically separated from DC buses L1, L3 of uninterruptible power supply device U2. However, DC buses L1 to L3 of uninterruptible power supply device U1 are electrically connected to DC buses L1 to L3 of uninterruptible power supply device Un by wiring Wn. Thus, the voltages at DC positive buses L1 of uninterruptible power supply devices U1 to Un can be kept equal to each other. The voltages at DC negative buses L2 of uninterruptible power supply voltage devices U1 to Un can be kept equal to each other. The voltages at DC neutral point buses L3 of uninterruptible power supply devices U1 to Un can be kept equal to each other.

Additionally, the voltages at DC buses L1 to L3 of uninterruptible power supply devices U1 to Un can collectively be detected by one voltage detector 6 connected to DC buses L1, L2 of uninterruptible power supply device Un.

In the case where the wiring Wn does not exist in the uninterruptible power supply system, in the example of FIG. 5, the voltages at DC buses L1 to L3 of uninterruptible power supply device U1 cannot be detected when the fuse unit FS1 is blown out. On the other hand, in the embodiment, the wirings W1 to Wn are annularly connected by providing wiring Wn, and DC buses L1 to L3 of uninterruptible power supply devices U1 to Un are electrically connected to each other through annular wirings W1 to Wn. For this reason, even when the fuse unit is blown out in any one of wirings W1 to Wn, DC buses L1 to L3 of uninterruptible power supply devices U1 to Un can electrically be connected to each other.

With this configuration, in the entire uninterruptible power supply system, uninterruptible power supply devices U1 to Un can be operated even after fuse unit FS1 is blown out, and resultantly the running of load 52 can be continued.

At this point, in uninterruptible power supply device U1, when the operation of the converter 1 cannot normally be performed due to the breakdown of transistor Q1 included in semiconductor module 20, for example, when an abnormality detection signal is output from a self-protection circuit incorporated in transistor Q1, control circuit 4 can stop the running of converter 1 and inverter 2. The abnormality detection signal is a signal output from the self-protection circuit when the overcurrent (or overheating) is detected in output of a current sensor (or temperature sensor) included in the self-protection circuit. When the running of uninterruptible power supply device U1 is stopped, in another uninterruptible power supply device, control circuit 4 obtains the sharing current of the running uninterruptible power supply device based on the number of uninterruptible power supply devices after the change, and controls inverter 2 such that inverter 2 output the sharing current.

When the pre-charging is performed on capacitors C1, C2 of each uninterruptible power supply device in preparation for the starting of the uninterruptible power supply system, even when fuse unit FS1 is blown out, the positive voltage and the negative voltage generated by pre-charging circuit 5 can be supplied to DC buses L1, L2 of uninterruptible power supply devices U2 to Un through wirings W2 to Wn. Thus, capacitors C1, C2 of each uninterruptible power supply device can be charged.

Effects of Embodiment

Effects of the power conversion system of the embodiment will be described below.

In the power conversion system of the embodiment, the voltages at DC buses L1 to L3 of uninterruptible power supply devices U1 to Un can be matched with each other by connecting each of DC buses L1 to L3 of uninterruptible power supply devices U1 to Un using wirings W1 to Wn.

Consequently, the input voltages at inverters 2 of uninterruptible power supply devices U1 to Un can be matched with each other, so that the cross current flowing between the output terminals of inverters 2 of uninterruptible power supply devices U1 to Un can be suppressed.

Further, in the power conversion system of the embodiment, only one voltage detector 6 and one pre-charging circuit 5 are enough for uninterruptible power supply devices U1 to Un, so that the downsizing and the cost reduction of the uninterruptible power supply system can be achieved.

Further, even when one of uninterruptible power supply devices U1 to Un is broken down, secondary breakdown of another uninterruptible power supply devices can be prevented by providing fuse units FS1 to FSn with respect to wirings W1 to Wn, and resultantly the breakdown range of the uninterruptible power supply system can be narrowed.

Further, in the power conversion system of the embodiment, wirings W1 to Wn connecting DC buses L1 to L3 of uninterruptible power supply devices U1 to Un to each other are annularly connected, so that DC buses L1 to L3 of uninterruptible power supply devices U1 to Un can be kept in the connection state even when any one of fuse units FS1 to FSn is blown out. Consequently, the input voltages at the inverters 2 of uninterruptible power supply devices U1 to Un can be matched with each other even after the fuse unit is blown out. The voltages at DC buses L1 to L3 of uninterruptible power supply devices U1 to Un can be detected using voltage detector 6. Further, capacitors C1, C2 of uninterruptible power supply devices U1 to Un can be charged using pre-charging circuit 5.

In the above embodiment, fuses F1 to F3 of each fuse unit are provided for the wiring lines Lp, Ln, and Lc of each wiring. Alternatively, one of three fuses F1 to F3 may be omitted. For example, fuses F1, F2 may be provided on wiring lines Lp and Ln while the fuse is not provided on wiring line Lc. Alternatively, fuses F1, F3 may be provided on wiring lines Lp, Lc while the fuse is not provided on wiring line Ln. Alternatively, fuses F2, F3 may be provided on wiring lines Ln, Lc while the fuse is not provided on wiring line Lp.

In the above embodiment, pre-charging circuit 5 is connected to DC buses L1, L2 of uninterruptible power supply device U1, and voltage detector 6 is connected to DC buses L1, L3 of uninterruptible power supply device Un. However, the present invention is not limited to this configuration. That is, pre-charging circuit 5 can be connected to DC buses L1, L2 of one of uninterruptible power supply devices U1 to Un, and voltage detector 6 can be connected to DC buses L1 to L3 of one of the uninterruptible power supply devices U1 to Un.

Further, in the above embodiment, the power conversion circuit included in each of converter 1 and inverter 2 is the three-level circuit. Alternatively, the power conversion circuit may be a two-level circuit.

It should be considered that the disclosed embodiment is an example in all respects and not restrictive. The scope of the present invention is defined by not the description above, but the claims, and it is intended that all modifications within the meaning and scope of the claims are included in the present invention.

REFERENCE SIGNS LIST

1: converter, 2: inverter, 3: bidirectional chopper, 4: control circuit, 5: pre-charging circuit, 6: voltage detector, 7, 8: switch, 9: communication line, 10: AC filter, 11 to 13: reactor, 14 to 16, C1, C2: capacitor, 20, 25: semiconductor module, 30: normal mode reactor, 31, 32: coil, 51: AC power supply, 52: load, 53: battery, U1 to Un: uninterruptible power supply device (power conversion device), L1: DC positive bus, L2: DC negative bus, L3: DC neutral point bus, T1 to T3, T11 to T13, T31 to T33: AC terminal, T4: neutral point terminal, T5 to T7, T21, T22, T34, T35: DC terminal, Q1 to Q8, Q21 to Q24: transistor, D1 to D8, D11 to D16, D21 to D24: diode, R1 to R3: resistance element, S1 to S3: AC switch, W1 to Wn: wiring, Lp, Ln, Lc: wiring, FS1 to FSn: fuse unit, F1 to F3, F11, F12: fuse.

The invention claimed is:

1. A power conversion system comprising:
   first to n-th power conversion devices connected in parallel to a load, n being an integer of 3 or more;
   first to n-th wirings; and
   first to n-th fuses provided in the first to n-th wirings, respectively,
   wherein a j-th power conversion device, j being an integer of 1 to n, includes:
   a converter that converts a first AC voltage into a DC voltage;
   an inverter that converts the DC voltage into a second AC voltage to supply the second AC voltage to the load;
   a DC bus through which the DC voltage is supplied from the converter of the j-th power conversion device to the inverter of the j-th power conversion device; and
   a capacitor that smooths the DC voltage, the capacitor being connected to the DC bus of the j-th power conversion device,
   an i-th wiring is connected between the DC bus of an i-th power conversion device and the DC bus of the (i+1)-th power conversion device, i being an integer of 1 to n−1,
   the n-th wiring is connected between the DC bus of the n-th power conversion device and the DC bus of the first power conversion device,
   the DC bus includes a DC positive bus and a DC negative bus,
   a j-th wiring includes first and second wiring lines,
   in the i-th wiring, first terminals of the first and second wiring lines are respectively connected to the DC positive bus and the DC negative bus of the i-th power conversion device, and second terminals of the first and second wiring lines are respectively connected to the DC positive bus and the DC negative bus of the (i+1)-th power conversion device,
   in the n-th wiring, first terminals of the first and second wiring lines are respectively connected to the DC positive bus and the DC negative bus of the n-th power conversion device, and second terminals of the first and second wiring lines are respectively connected to the DC positive bus and the DC negative bus of the first power conversion device without connection to other of the power conversion devices.

2. The power conversion system according to claim 1, further comprising a voltage detector that detects the DC voltage of the DC bus of the j-th power conversion device, the voltage detector being connected to the DC bus of one of the first to n-th power conversion devices.

3. The power conversion system according to claim 1, further comprising a pre-charging circuit that charges each capacitor of the first to n-th power conversion devices in preparation for starting of the power conversion system, the pre-charging circuit being connected to the DC bus of one of the first to n-th power conversion devices.

4. The power conversion system according to claim 1, wherein an i-th fuse is blown out by current flowing between the DC bus of the i-th power conversion device and the DC bus of the (i+1)-th power conversion device when the i-th or (i+1)-th power conversion device is broken down.

5. The power conversion system according to claim 4, wherein a rated breaking current value of the i-th fuse is smaller than a rated current value of each of the i-th or (i+1)-th power conversion device.

6. The power conversion system according to claim 1, wherein an allowable current value of the i-th wiring is smaller than an allowable current value of the DC bus.

7. The power conversion system according to claim 1, wherein the converter of the j-th power conversion device converts AC power supplied from an AC power supply into DC power, the j-th power conversion devices further include a bidirectional chopper connected between the DC bus of the j-th power conversion device and a power storage device, the bidirectional chopper of the i-th power conversion device supplying the DC power generated by the converter of the j-th power conversion device to the power storage device in a normal time when an AC power is supplied from the AC power supply, and the bidirectional chopper of the j-th power conversion device supplying the DC power of the power storage device to the inverter of the j-th power conversion device at a power outage time when the supply of the AC power from the AC power supply is stopped.

\* \* \* \* \*